United States Patent
Hayashi et al.

[11] Patent Number: 6,154,337
[45] Date of Patent: Nov. 28, 2000

[54] CASSETTE TRANSFER APPARATUS

[75] Inventors: Akio Hayashi, Kanagawa pref.; Katsuhiko Tanaka, Ibaraki pref.; Hidemi Tachikawa, Tokyo; Hitoshi Nakamura, Ibaraki pref.; Koutaro Onso; Tetsuya Yoshioka, both of Tokyo, all of Japan

[73] Assignee: Asaca Corporation, Tokyo, Japan

[21] Appl. No.: 09/007,063

[22] Filed: Jan. 14, 1998

[51] Int. Cl.[7] ............................ G11B 15/68; G11B 17/04
[52] U.S. Cl. .............................. 360/92; 369/178
[58] Field of Search .................... 360/92; 369/34, 369/35, 38, 178, 179, 180, 191

[56] References Cited

U.S. PATENT DOCUMENTS

| | | | |
|---|---|---|---|
| 4,903,154 | 2/1990 | Costas et al. | 360/92 |
| 4,912,575 | 3/1990 | Shiosaki | 369/191 |
| 5,060,090 | 10/1991 | Kobayashi et al. | 360/92 |
| 5,128,817 | 7/1992 | Herger et al. | 360/92 |
| 5,210,729 | 5/1993 | Schmidt et al. | 360/98.05 |
| 5,353,101 | 10/1994 | Kobayashi et al. | 360/98.04 |
| 5,429,470 | 7/1995 | Nicol et al. | 360/92 |

*Primary Examiner*—David Davis
*Attorney, Agent, or Firm*—Varndell & Varndell, PLLC

[57] ABSTRACT

An apparatus for automatically exchanging a number of record medium cassettes includes a housing, a cassette storing device arranged within said housing for storing the cassettes, recording and reproducing devices arranged within said housing for recording and reproducing information on and from the record medium cassettes, a cassette transporting device arranged within said housing for transporting a plurality of cassette hand over units, a mail box having a cassette supply room and a cassette receipt room, a transport unit for transporting the cassettes between the cassette hand over units and the mail box. By using a plurality of cassette hand over units, the cassettes can be transported efficiently. By using the mail box, a new cassette can be automatically supplied into the housing and an unnecessary cassette can be automatically removed from the housing.

9 Claims, 11 Drawing Sheets

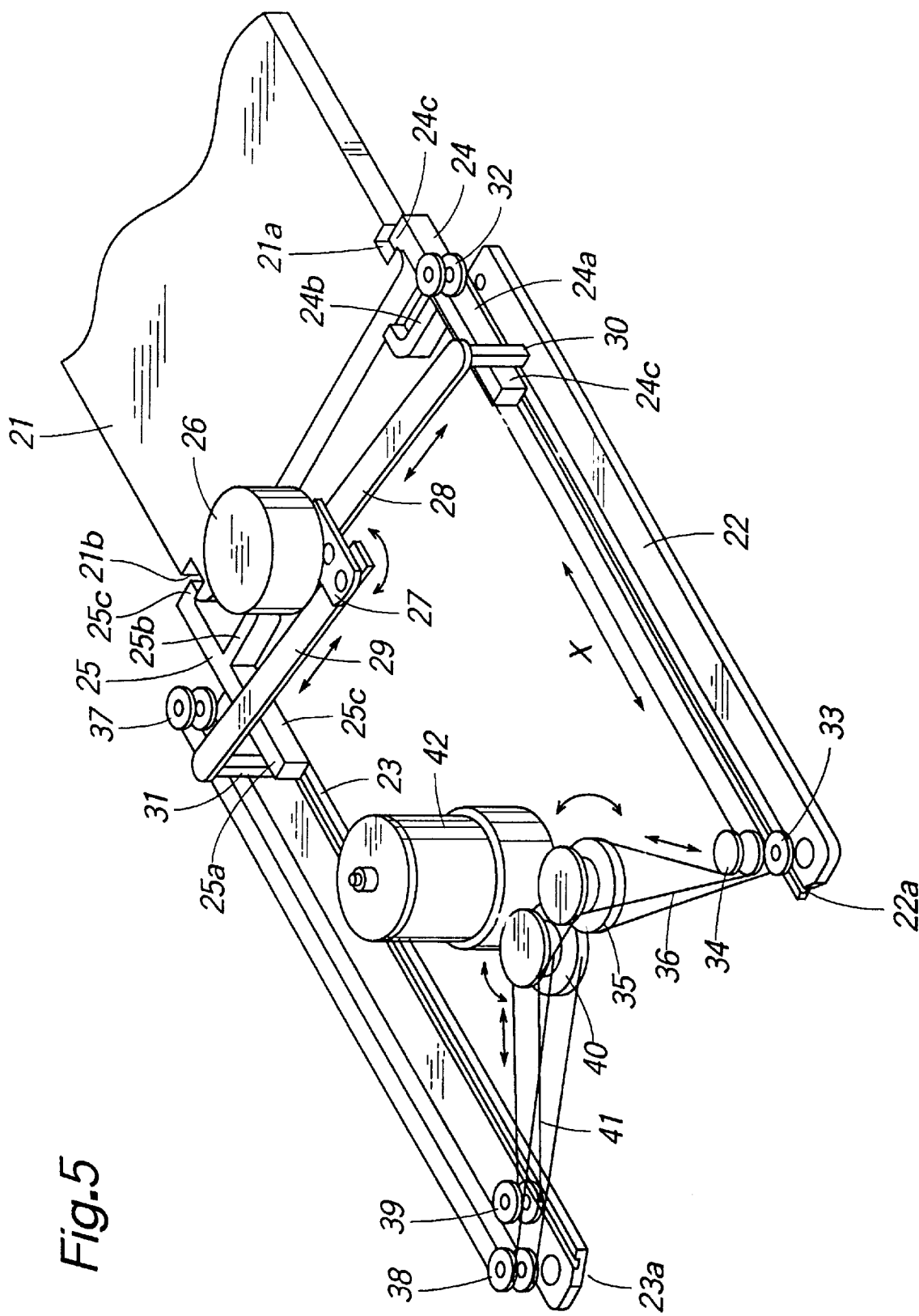

CASSETTE TRANSFER APPARATUS

BACKGROUND OF THE INVENTION

1. Field of the Invention

The present invention relates to an apparatus for automatically exchanging a number of record medium cassettes with respect to a recording and reproducing device or devices. Such an automatic cassette exchange apparatus may be advantageously used in a mass storage system of computer and broadcasting equipment. It should be noted that in the present specification, the record medium cassette means a cassette or cartridge of any shape and construction containing any kind of a record medium on and from which any kind of information can be recorded and reproduced.

2. Related Art Statement

A known automatic cassette exchange apparatus includes a cassette storing means for storing a number of record medium cassettes, a recording and reproducing means for recording and reproducing information on and from the record medium cassettes, a cassette transporting means for transporting the record medium cassettes between the cassette storing means and the recording and reproducing means, and a controlling means for controlling said cassette storing means, recording and reproducing means and cassette transporting means.

FIG. 1 is a schematic view showing a known apparatus for automatically exchanging record medium cassettes. The automatic cassette exchange apparatus includes a housing 1, in which a cassette storing unit 2 is arranged rotatably. In the housing 1, four recording and reproducing units 3 are provided above the cassette storing unit 2, and beside the cassette storing unit and the recording and reproducing unit, a cassette transporting unit 4 is arranged.

In the known automatic cassette exchange apparatus, when a cassette stored in the cassette storing unit 2 is to be set into the recording and reproducing unit 3, the cassette is first removed from the cassette storing unit 2 into a cassette hand over unit 5, and then the cassette hand over unit is moved by the cassette transporting unit 4 into a position of the recording and reproducing unit 3. Finally, the cassette hand over unit 5 inserts the relevant cassette into the recording and reproducing unit 3. When a cassette installed into the recording and reproducing unit 3 is to be returned into the cassette storing unit 2, the above mentioned operations are carried out in a reverse order.

FIGS. 2A–2D and FIGS. 3A–3B are schematic views showing the successive operation of the known automatic cassette exchanging apparatus.

When a cassette M1 installed in the recording and reproducing unit 3 is to be replaced by a cassette M2 stored in a cassette room 2A of the cassette storing unit 2, at first, the cassette M1 is inserted into the cassette hand over unit 5 as illustrated in FIG. 2A. Then, the cassette hand over unit 5 is moved by the cassette transporting unit not shown in FIG. 2 into a position in front of an empty cassette room 2B and the cassette M1 is inserted into the cassette room 2A as depicted in FIG. 2B. Next, the cassette hand over unit 5 is moved in front of the cassette room 2A and the cassette M2 stored therein is inserted into the cassette hand over unit 5 as illustrated in FIG. 2C. Then, the cassette hand over 5 is moved upward into a position in front of the recording and reproducing unit 3 and the cassette M2 is inserted into the recording and reproducing unit 3 as shown in FIG. 2D.

When cassettes M7, M8 - - - stored in lower cassette rooms 2G, 2H - - - have to be removed into upper empty cassette rooms 2A, 2B - - -, the cassette hand over unit 5 is first moved by the cassette transporting unit into a position in front of the cassette room 2G and the cassette M7 is inserted into the cassette hand over unit as shown in FIG. 3A. Then, the cassette hand over unit 5 is moved into a position in front of the cassette room 2A and the cassette is inserted into the cassette room 2A as illustrated in FIG. 3B. Next, the cassette hand over unit 5 is moved downward into a position in front of the cassette room 2H and the cassette M8 is inserted into the hand over unit. After that, the cassette hand over unit 5 is moved upward again into a position in front of the cassette room 2B and the cassette M8 is inserted into the cassette room 2B. The above mentioned operations are repeated to remove the cassettes within the cassette storing unit 2.

In the known automatic cassette exchange apparatus explained above, when one or more cassettes are required to be newly installed into the cassette storing unit 2 or one or more stored cassettes are required to be removed from the cassette storing unit 2, the following complicated operations have to be carried out.

(a) The operation of the apparatus is stopped and a door not shown is opened.

(b) Unnecessary cassette or cassettes are removed from the cassette storing unit 2 and one or more cassettes are newly installed in the cassette storing unit.

(c) The door is closed and the apparatus is operated again.

This operation is quite cumbersome and requires a rather long time, mainly due to a fact that the above explained operation could not be performed automatically.

Furthermore, in the known automatic cassette exchange apparatus, if the cassette hand over unit 5 becomes out of order, the whole apparatus could not operate correctly, and thus the cassette exchange and removal could not be performed any more.

SUMMARY OF THE INVENTION

The present invention has for its object to provide a novel and useful automatic cassette exchange apparatus, in which one or more cassettes can be automatically installed into and removed from the cassette storing unit without stopping the operation of the apparatus.

It is another object of the invention to provide an automatic cassette exchange apparatus, in which the cassette exchanging operation can be performed reliably and efficiently within a short time.

According to a first aspect of the invention, an automatic cassette exchange apparatus for automatically exchanging a number of record medium cassettes comprises:

a cassette storing means for storing a plurality of record medium cassettes;

a recording and reproducing means for recording and reproducing information on and from record medium cassettes;

a cassette transporting means for transporting the record medium cassettes between the cassette storing means and the recording and reproducing means and including a plurality of cassette hand over units and a driving unit for moving said plural cassette hand over units; and a controlling means for controlling said cassette storing means, recording and reproducing means and cassette transporting means.

In a preferable embodiment of the automatic cassette exchanging apparatus according to the invention, said plurality of cassette hand over units are controlled by said controlling means independently from each other.

In the automatic cassette exchange apparatus according to the first aspect of the invention, when a new record medium cassette stored in the cassette storing means is to be installed in the recording and reproducing means, the relevant cassette is first set into an empty cassette hand over unit, then all the cassette hand over units are moved to the recording and reproducing means, and then a cassette installed in the recording and reproducing means is transferred into an empty cassette hand over unit. After that, the new cassette within the cassette hand over unit is transferred into the recording and reproducing means. Further, when a plurality cassettes are to be replaced within the cassette storing means, all the relevant cassettes are simultaneously transferred into empty cassette hand over units, then the cassette hand over units are moved into positions in front of empty cassette rooms, and finally all the cassettes in the cassette hand over units are simultaneously transferred into the empty cassette rooms.

According to a second aspect of the invention, an automatic cassette exchange apparatus for automatically exchanging a number of record medium cassettes comprises:

a housing;

a cassette storing means arranged within said housing for storing a plurality of record medium cassettes;

a recording and reproducing means arranged within said housing for recording and reproducing information on and from record medium cassettes;

a mailing means for supplying and removing one or more record medium cassettes into and from said housing;

a cassette transporting means arranged within said housing for transporting the record medium cassettes among said cassette storing means, recording and reproducing means and mailing means, and including at least one cassette hand over unit and a driving unit for moving said cassette hand over unit; and a controlling means for controlling said cassette storing means, recording and reproducing means, mailing means and cassette transporting means.

In a preferable embodiment according to the second aspect of the present invention, said mailing means includes a mail box arranged outside said housing, a transport unit arranged within said housing for transporting the cassette between said mail box and the cassette hand over unit, and a cassette transferring means for transferring the cassette between said mail box and said transport unit. In a preferable embodiment of the automatic cassette exchange apparatus according to the invention, said cassette transferring means includes a stopper for selectively allowing a passage of the cassette between said mail box and said transport unit, and said mail box includes a cassette supply room and a cassette receipt room arranged below said cassette supply room.

Then, it is preferable to construct said stopper of the cassette transferring means such that it restricts the movement of the cassette from the mail box to the transport unit and the cassette falls into the cassette receipt room due to the force of gravity.

In the automatic cassette exchange apparatus according to the second aspect of the invention, when a cassette stored in the cassette storing means or installed in the recording and reproducing means is to removed from the apparatus, the relevant cassette is first transferred into the empty cassette hand over unit, and then the cassette hand over unit is moved into a position in front of the mailing means. After that, the cassette is transferred from the cassette hand over unit into the mailing means. Finally, the mailing means remove the cassette out of the apparatus. When a cassette is to be newly supplied into the apparatus, the cassette is first set in the mailing means, and then the mailing means transports the cassette into the apparatus. Next, the cassette is transferred into the cassette hand over unit, and finally the cassette is supplied into the cassette storing means or recording and reproducing means by means of the cassette transporting means and cassette hand over unit. In order to perform the above operations much more efficiently, it is particularly preferable to provide a plurality of cassette hand over units in the cassette transporting means.

BRIEF DESCRIPTION OF THE DRAWINGS

FIG. 5 is a perspective view showing an embodiment of the cassette hand over unit according to the invention;

DESCRIPTION OF THE PREFERRED EMBODIMENTS

Now the present invention will be explained in detail with reference to the accompanying drawings.

Figure 1:
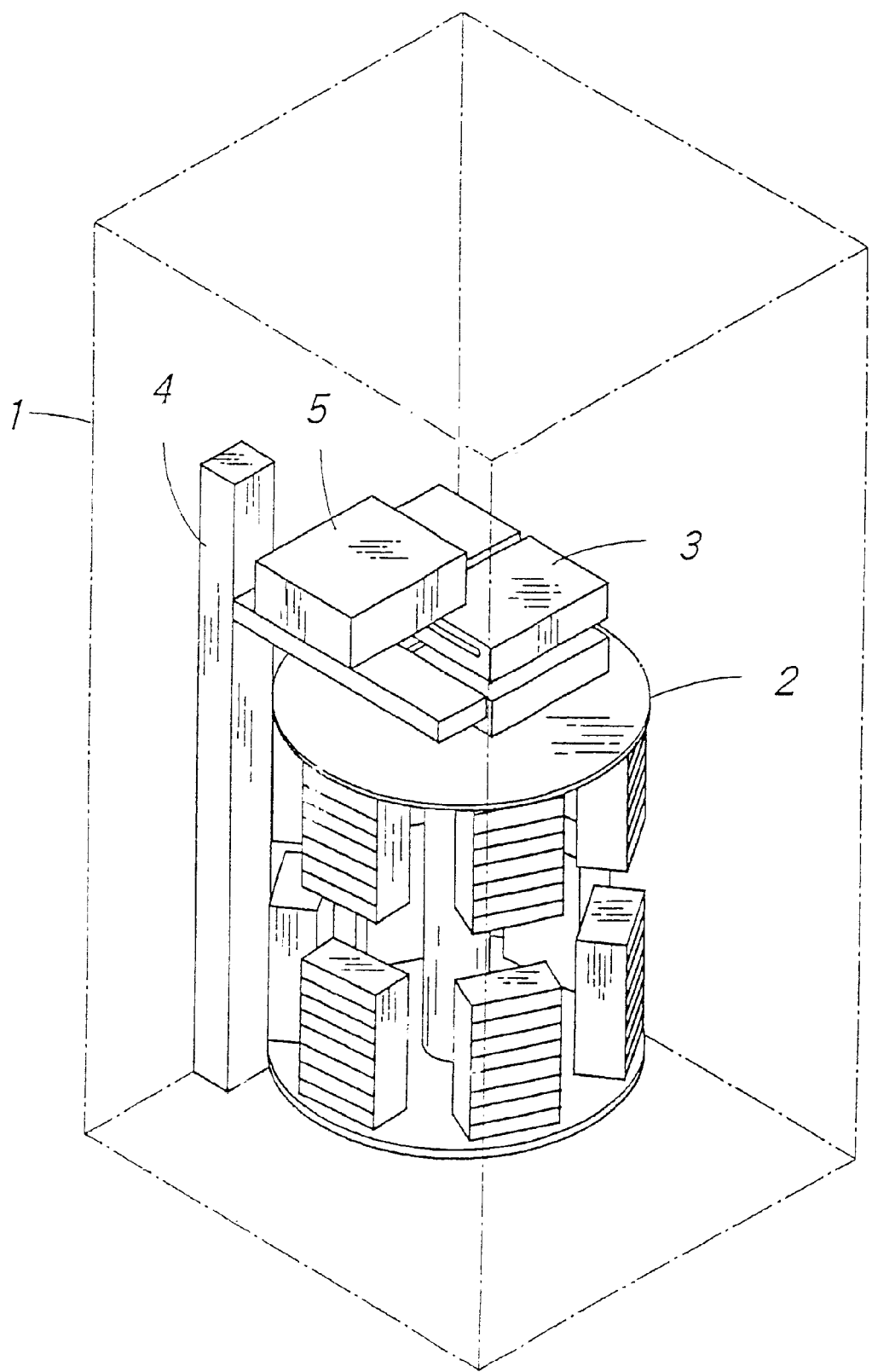
FIG. 1 is a perspective view showing the known automatic cassette exchange apparatus.
Figure 2A:
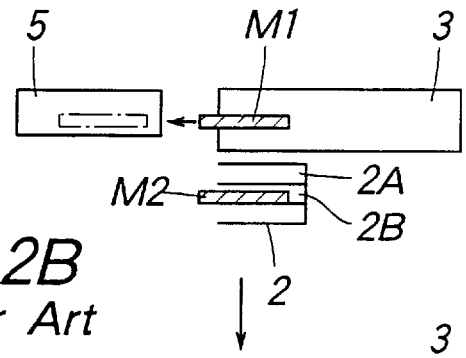
FIGS. 2A to 2D are schematic views illustrating the cassette transfer operation in the known apparatus.
Figure 2B:
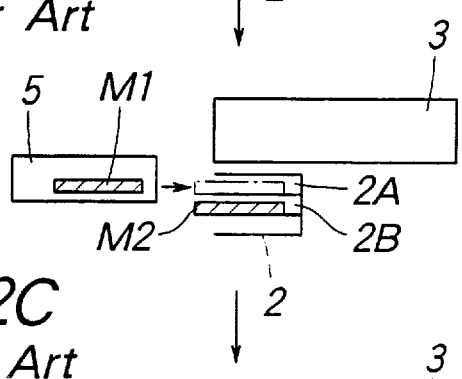
Figure 2C:
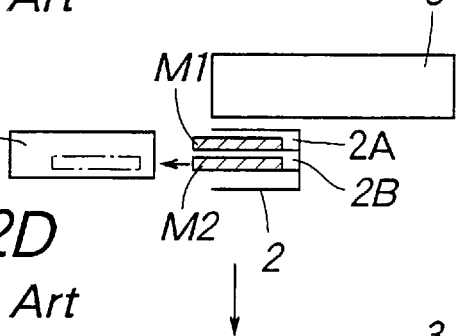
Figure 2D:
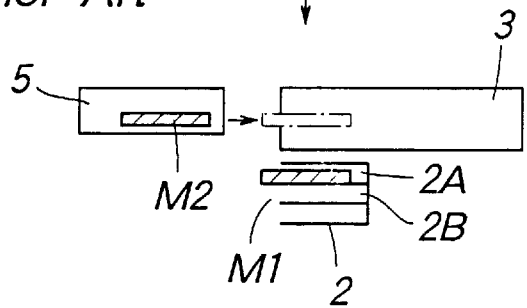
Figure 3A:
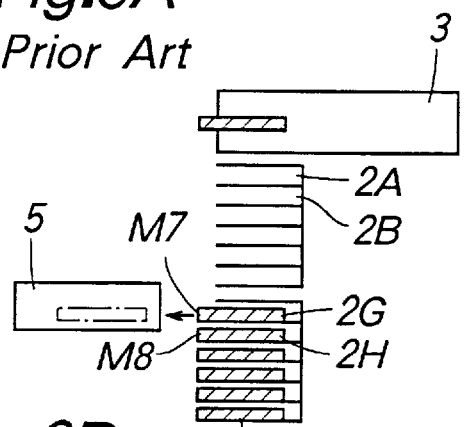
FIGS. 3A and 3B are schematic views depicting the cassette transfer operation in the known apparatus.
Figure 3B:
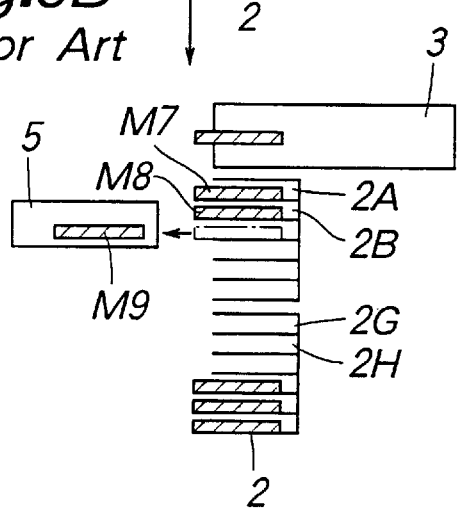
Figure 4:
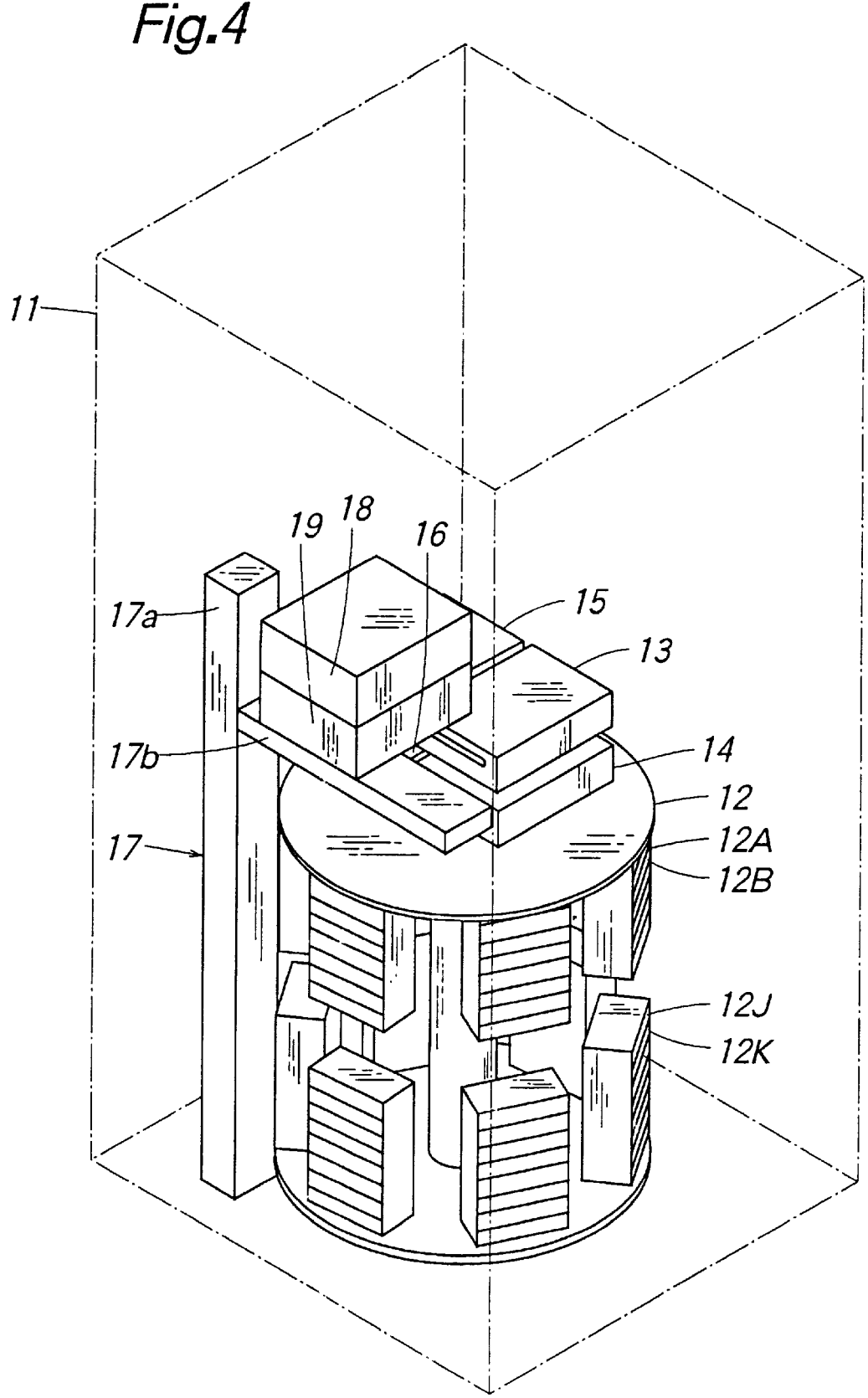
FIG. 4 is a perspective view depicting an embodiment of the automatic cassette exchange apparatus according to the invention.

FIGS. 4 and 5 show an embodiment of the automatic cassette exchange apparatus according to the first aspect of the present invention. As illustrated in FIG. 4, the automatic cassette exchange apparatus comprises a housing 11, a cassette storing device 12 storing a number of record medium cassettes such as opto-magnetic discs, four recording and reproducing devices 13–16 provided above the cassette storing device 12, each of which can perform the recording and/or reproducing for a cassette installed in a relevant recording and reproducing device, and a cassette transporting device 17 arranged besides the cassette storing device 12 and recording and reproducing devices 13–16, said cassette transporting device transporting the cassettes between the cassette storing device 12 and each of the recording and reproducing devices 13–16.

The cassette storing device 12 includes a rotating drum, an upper cassette storing rooms 12A, 12B - - - and a lower cassette storing rooms 12J, 12K - - - , each being able to store a number of cassettes. The cassette transporting device 17 includes an upright guide rail 17a, a horizontal guide rail 17b which can move up and down along the upright guide rail 17a, and a cassette hand over mechanism provided on the horizontal guide rail 34b movably along the horizontal guide rail. A plurality of cassette hand over units, in the present embodiment, two cassette hand over units 18 and 19 are provided on the horizontal guide rail 17b such that the cassette hand over devices can move horizontally. The cassette hand over units 18 and 19 have the same construction which corresponds to the construction of the cassette storing device 12 and recording and reproducing devices 13–16. Within the housing 11, there is further provided a controller for controlling the cassette storing device 12, recording and reproducing devices 13–16, cassette transporting device 17 and cassette hand over units 18 and 19.

FIG. 5 is a perspective view showing the driving mechanism installed in the cassette hand over units 18 and 19. A pair of guide arms 22 and 23 are arranged rotatably about pins provided at rear ends thereof. The guide arms 22 and 23 have formed therein guide grooves 22a and 23a, respectively, and claw members 24 and 25 are fit into the grooves 22a and 23a, respectively such that the claw members can move along the guide grooves. Front ends of the guide arms 22 and 23 are coupled with link shafts 30 and 31 of links 28 and 29, respectively, which are coupled with a rotary solenoid 26 by means of a link 27. By driving the rotary solenoid 26, a distance between the front ends of the guide arms 22 and 23 can be adjusted. The claw members 24, 25 comprise main portions 24a, 25a extending in a longitudinal direction and side arm portions 24b, 25b extending from the main portions toward inside. At front ends of the main portions 24a, 25a, there are formed engaging claws 24c, 25c which can engage with side recesses 21a, 21b formed in side walls of a record medium cassette 21.

The claw member 24 is connected to a belt 36 which is wound around rollers 32, 33, 34 and a gear 35. The claw member 24 is connected to an endless belt 41 which is wound around rollers 37, 38, 39 and a gear 40. The gears 35 and 40 coupled with a driving motor 42 such that when the driving motor 42 is driven, the claw members 24, 25 are moved in the longitudinal direction X.

When the cassette 21 is taken into the cassette hand over unit 18 or 19 from the cassette storing device 12 or recording and reproducing devices 13–16, at first a command is supplied from the controller to the driving motor 42 and the driving motor is operated. Then, the claw members 24 and 25 are moved into such positions that they can grasp the cassette 21. Next, the rotary solenoid 26 is energized and the front ends of the guide arms 22 and 23 are rotated inwardly by means of the links 27, 28 and 29. During this rotation, the engaging claws 24c and 25c are engaged with the side recesses 21a and 21b of the cassette 21. After that, the driving motor 42 is driven in the opposite direction and the claw members 24 and 25 having the cassette 21 engaged therewith are moved into the cassette hand over unit 18 or 19.

When the cassette contained in the cassette hand over unit 18 or 19 is to be inserted into the cassette storing device 12 or one of the recording and reproducing devices 13–16, the driving motor 42 is driven in the forward direction to move the claw members 24 and 25 having the cassette 21 engaged therewith toward the cassette storing device or recording and reproducing device. Then, the rotary solenoid 26 is energized to rotate the front ends of the guide arms 22 and 23 outwardly to remove the cassette 21 from the engaging claws 24c and 25c. At the same time, the cassette 21 is pushed toward the cassette storing device 12 or recording and reproducing device 13–16 by means of the side arms 24b and 25b.

Now the operation of the automatic cassette exchange apparatus of the present embodiment will be explained with reference to FIGS. 6 to 9.

Figure 6A:
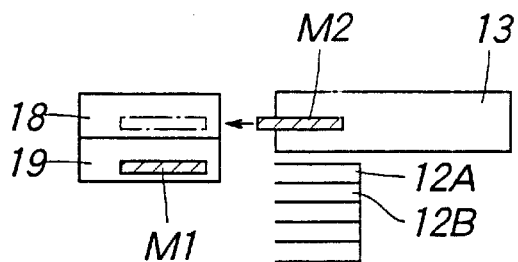
FIGS. 6A and 6B are schematic views representing the cassette hand over operation.
Figure 6B:
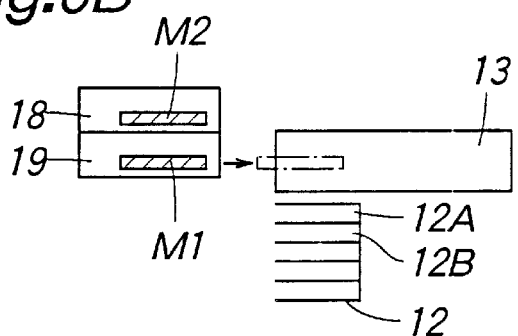

FIGS. 6A and 6B show successive operations for exchanging cassettes M1 and M2 between the cassette storing device 12 and the recording and reproducing device 13.

As illustrated in FIG. 6A, the cassette M1 stored in a cassette room 12A of the cassette storing device 12 is taken into the cassette hand over unit 19. Then, the cassette hand over units 18 and 19 are moved into positions in front of the recording and reproducing device 13 by the transporting device 17.

Next, as depicted in FIG. 6B, the cassette M2 installed in the recording and reproducing device 13 is inserted into the empty cassette hand over unit 18. After that, the cassette hand over units 18 and 19 are slightly moved upward by the transporting device 17. Finally, the cassette M1 in the cassette hand over unit 19 is inserted into the recording and reproducing device 13.

In this manner, in the present embodiment, upon exchanging the cassettes M1 and M2 between the cassette storing device 12 and the recording and reproducing devices 13–16, it is not necessary to transport the cassette M2 installed in the recording and reproducing devices to the cassette storing device 12 prior to inserting the cassette Ml into the recording and reproducing devices. Therefore, a time required for such operation can be saved and the cassettes Ml and M2 can be exchanged in a shorter time.

Figure 7:
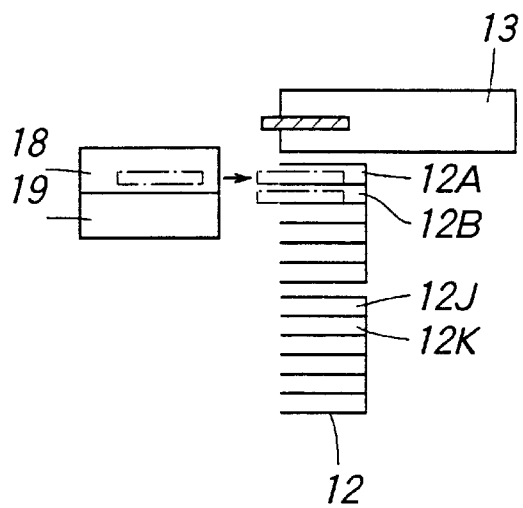
FIG. 7 is a schematic view illustrating the cassette hand over operation.

FIG. 7 illustrates the operation, in which one of the cassette hand over units 18 and 19, e.g. the cassette hand over unit 19 is out of order. In this case, the cassette exchange can be performed by using the other cassette hand over unit 18. Therefore, the cassette exchange apparatus can be still utilized.

Figure 8:
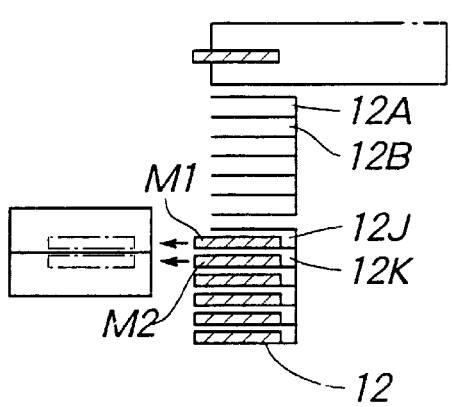
FIG. 8 is a schematic view depicting the cassette hand over operation.
Figure 9:
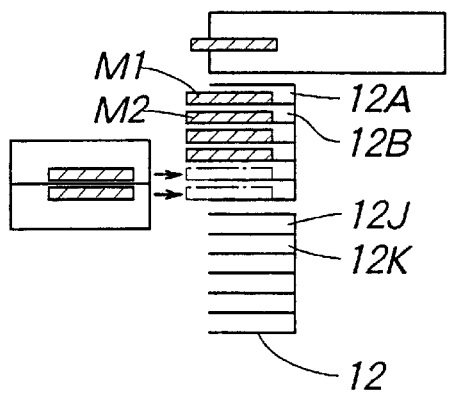
FIG. 9 is a schematic view expressing the cassette hand over operation.

FIGS. 8 and 9 show the operation for transferring cassettes M1, M2 - - - stored in lower cassette rooms 12J, 12K - - - to upper cassette rooms 12A, 12B - - - . In this case, two cassettes can be moved simultaneously, and thus this operation can be carried out within a half time as compared with the known cassette exchange apparatus having a single cassette hand over unit.

In the present embodiment, two cassette hand over units 18 and 19 are provided, but according to the invention, more than two cassette hand over units may be provided in accordance with the driving power of the transporting device 17. Moreover, the cassette hand over units 18 and 19 are constructed to handle the opto-magnetic disc, but they may be formed to treat other record medium cassettes such as CD, CD-R, DLT tape, VHS tape, 3480 tape and 3590 tape. Furthermore, the cassette hand over units 18 and 19 may be constructed to handle different kinds of record medium cassettes.

Figure 10:
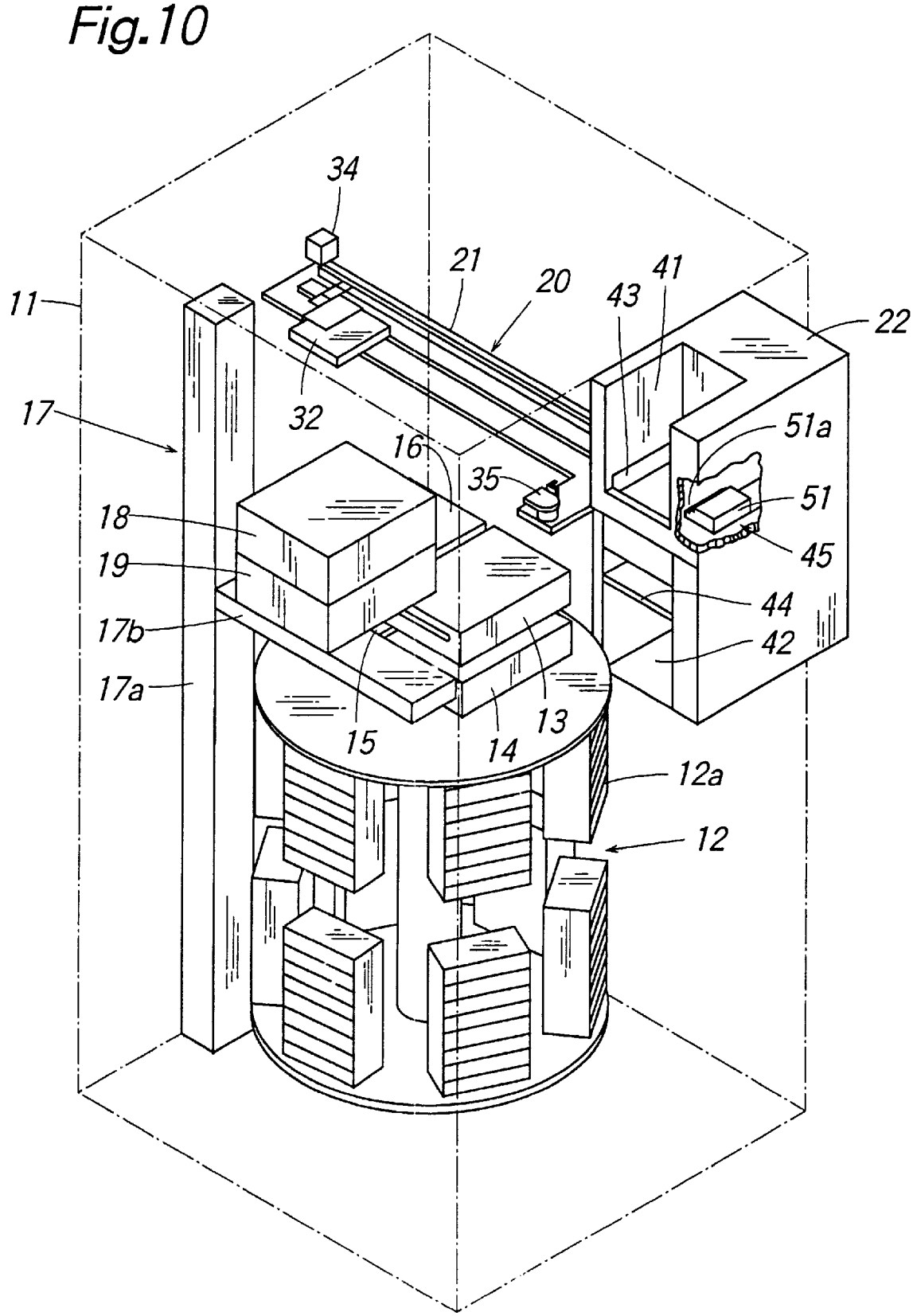
FIG. 10 is a perspective view showing an embodiment of the automatic cassette exchange apparatus according to the second aspect of the invention.

FIG. 10 is a perspective view showing an embodiment of the automatic cassette exchange apparatus according to the second aspect of the invention. In the present embodiment, portions similar to those of the previous embodiment are denoted by the same reference numerals and their explanation is dispensed with. In the present embodiment, above the recording and reproducing devices 13–16, there is arranged a mail unit 20, and the transporting device 17 is constructed such that the cassettes can be moved among the cassette storing device 12, recording and reproducing devices 13–16 and mail unit 20. To this end, also in the present embodiment, there are provided two cassette hand over units 18 and 19.

Figure 11:
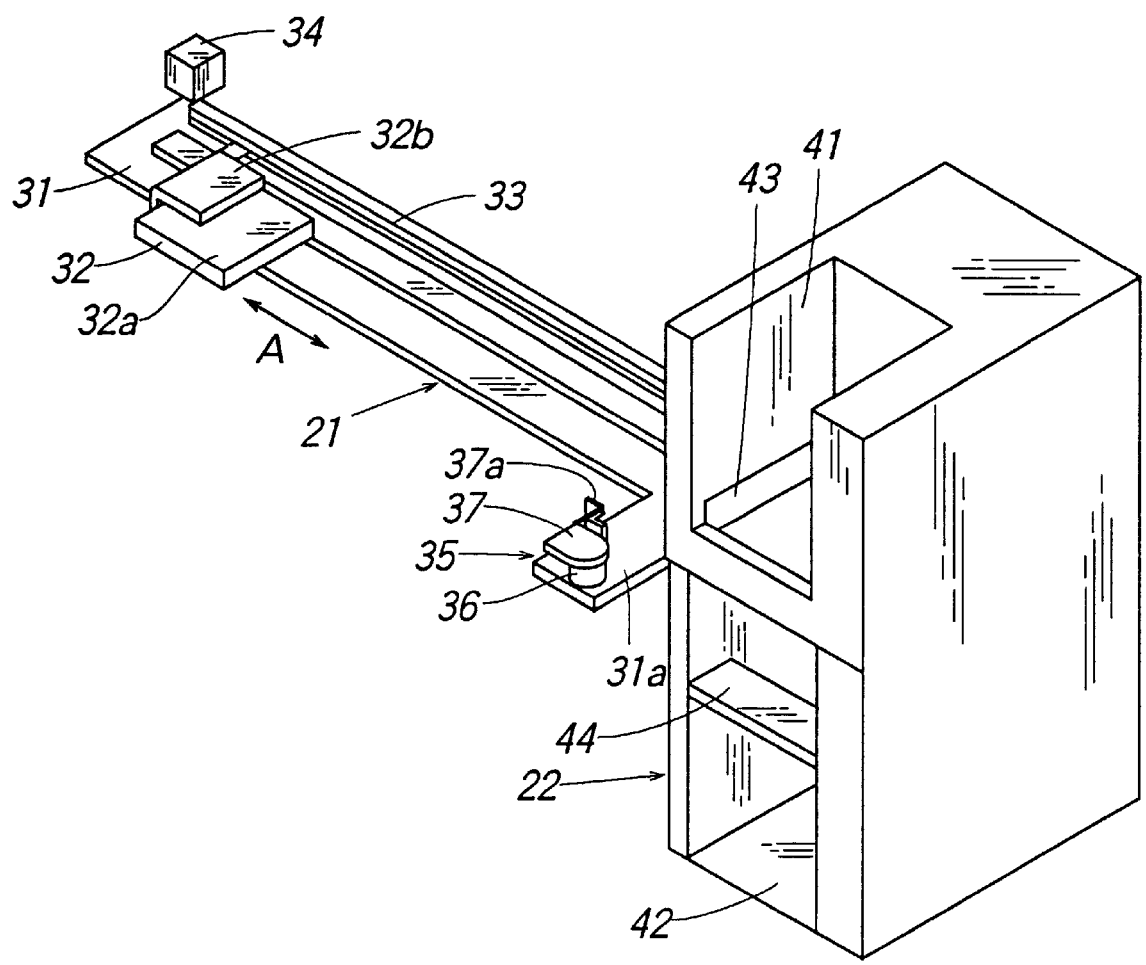
FIG. 11 is a perspective illustrating the mailing means of the apparatus of FIG. 10.

FIG. 11 is a perspective view illustrating the mail unit 20 for transporting cassettes from and into the housing 11 of the apparatus. To this end, the mail unit 20 comprises a transport unit 21 arranged within the housing 11, and a mail box 22 arranged outside the housing 11.

The transport unit 21 includes a base 31 having a side arm 31a, and a carrier 32 supporting the cassette and arranged movably on the base 31. The carrier 32 is coupled with a driving motor 34 by means of a belt 33 and is moved reciprocally in a direction A. The carrier 32 includes a bottom plate 32a having a size substantially equal to the cassette and a top plate 32b smaller than the bottom plate 32a. The bottom plate 32a and top plate 32b are arranged such that the cassette can be held therebetween. To the side arm 31a of the base 31, is secured a stopper 35 for restricting the return of the cassette transported by the carrier 32.

The stopper 35 comprises an electromagnetic solenoid 36 fixed to the base 31 and a rotary plate 37 coupled with the rotary solenoid 36. The rotary plate 37 has formed therein a restricting portion 37a which is brought into contact with a rear wall of the cassette.

Figure 12A:
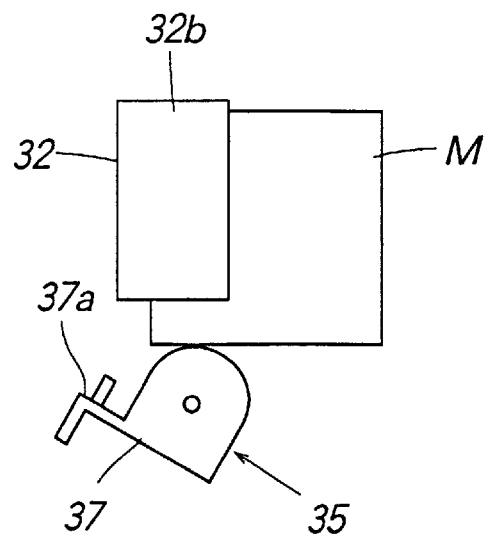
FIGS. 12A–12C are schematic views showing the function of the stopper of the mailing means.
Figure 12B:
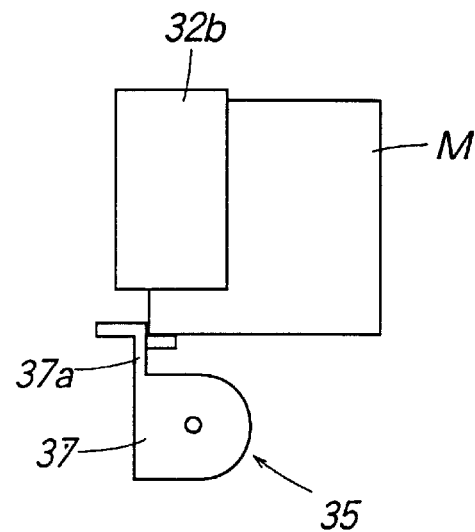
Figure 12C:
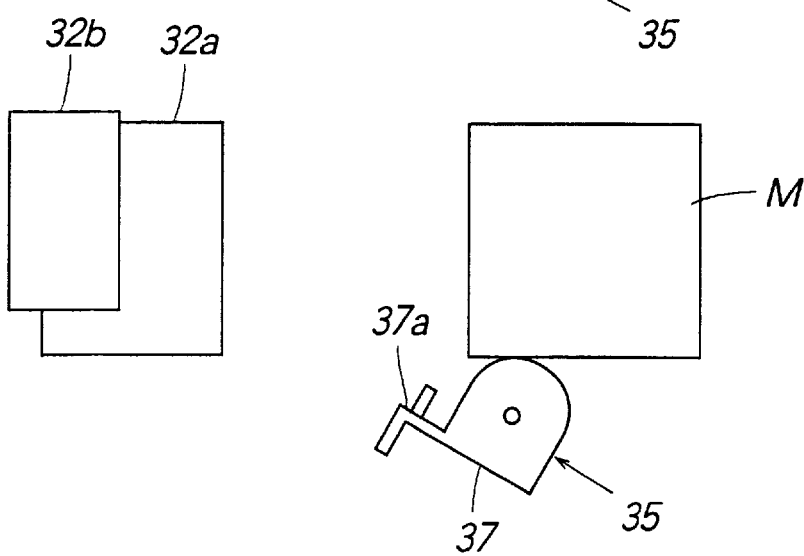

FIGS. 12A–12C are schematic plan views depicting the operations of the stopper 35. When the rotary plate 37 is in a position illustrated in FIG. 12A, the cassette M held by the carrier 32 is allowed to pass toward the mail box 22. After that, the rotary plate 37 is rotated into a position shown in FIG. 12B, in which the restricting portion 37a of the rotary plate 37 is urged against the rear wall of the cassette M. When the carrier 32 is returned toward the driving motor 34, the cassette M is removed from the carrier 32 as illustrated in FIG. 12C. After that, the rotary plate 37 is rotated into the position shown in FIG. 12A.

The stopper 35 is arranged at such a position that after more than a half of the cassette M has been moved out of the housing 11 by the carrier 32, the stopper is urged against the rear wall of the cassette M. Therefore, when the cassette M is removed from the carrier 32 during the return movement of the carrier, the cassette falls down into the mail box 22 due to the force of gravity.

The mail box 22 includes a cassette supply room 41 and a cassette receipt room 42 arranged below the cassette supply room. At the lowermost portion of the cassette supply room 41, there is formed an opening 43 through which the cassette is moved between the carrier 32 and the mail box 21. Within the cassette receipt room 42, there is arranged a cassette receiving plate 44 which is supported movably up and down by means of a resilient member not shown.

Figure 13:
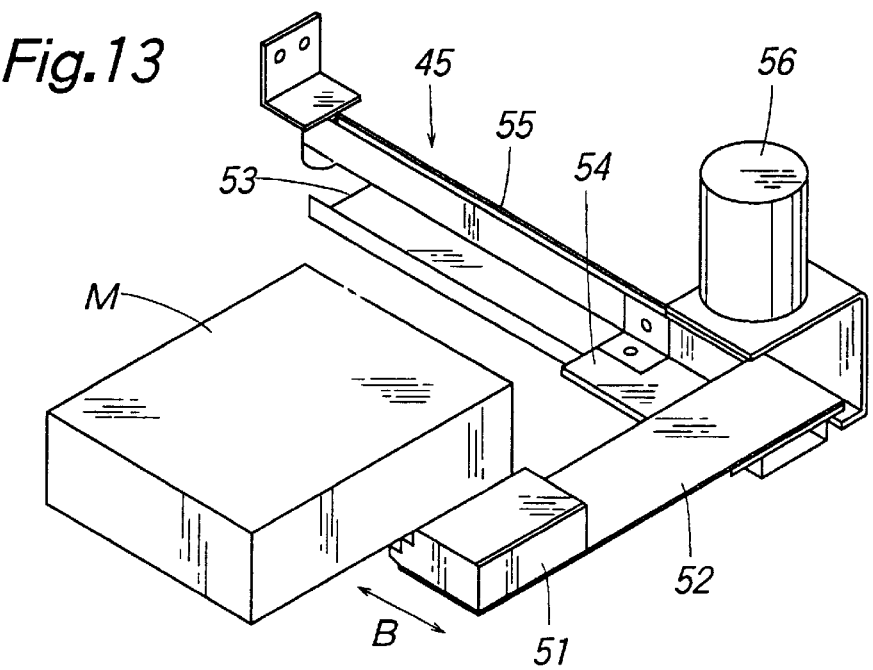
FIG. 13 is a perspective view depicting the cassette pushing mechanism of the mailing means.

Within the cassette supply room 41, there is also provided a cassette pushing mechanism for pushing a new cassette into the carrier 32. As shown in FIG. 13, the cassette pushing mechanism 45 comprises a pushing member 51 secured to one end of an arm 52 which is secured to a slide plate 54. The slide plate 54 is arranged movably on a base 53 reciprocally in a direction B and is coupled with a driving motor 56 by means of a belt 55. In an inner surface of the pushing member 51, there are formed plural steps 51a so that the lowermost cassette of a stack of cassettes is moved into a position at which the cassette is pushed into the carrier 32.

Now the operation for supplying a new cassette into the housing 11 and the operation for removing a cassette from the housing will be explained with reference to FIGS. 14–24.

Figure 14:
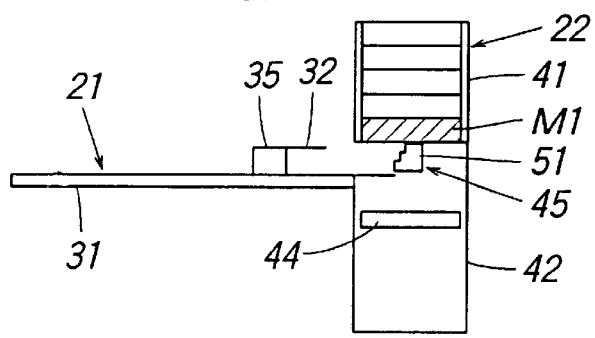
FIGS. 14–24 are schematic views for explaining the operation of the mailing means.

As shown in FIG. 14, in a condition that the pushing member 51 of the cassette pushing mechanism 45 is in a position just below the cassette supply room 41 of the mail box 22, a necessary cassette M1 is supplied into the cassette supply room 41. It should be noted that in this condition, the carrier 32 of the transport unit 21 has been moved near the mail box 22 and the stopper 35 has been in the position in which it allows the passage of the cassette.

Figure 15:
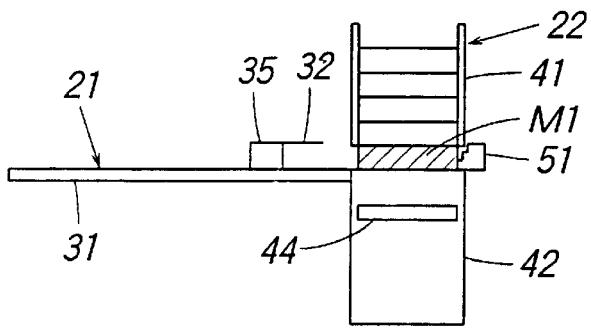

Then, the driving motor 56 of the cassette pushing mechanism 45 is energized to move the arm 52 outwardly. During this movement, the pushing member 51 is disengaged from the cassette M1 as illustrated in FIG. 15. As the result of this, the cassette M1 falls into a space between the pushing member 51 and the carrier 32.

Figure 16:
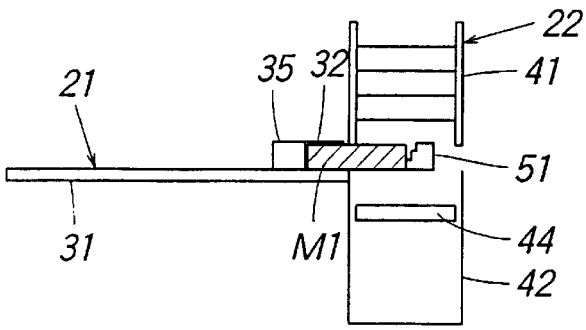

Next, the pushing member 51 is moved toward the carrier 32 as depicted in FIG. 16 to push the cassette into the carrier 32.

Figure 17:
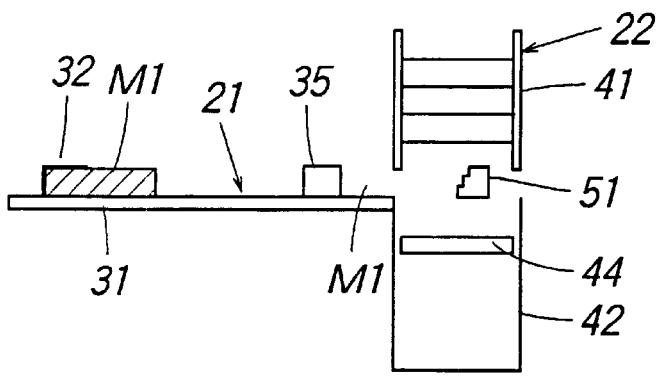

Then, the driving motor 34 of the transport unit 21 is energized to move the carrier 32 having the cassette M1 placed thereon into a substantially middle of the housing 11 as shown in FIG. 17.

Figure 18:
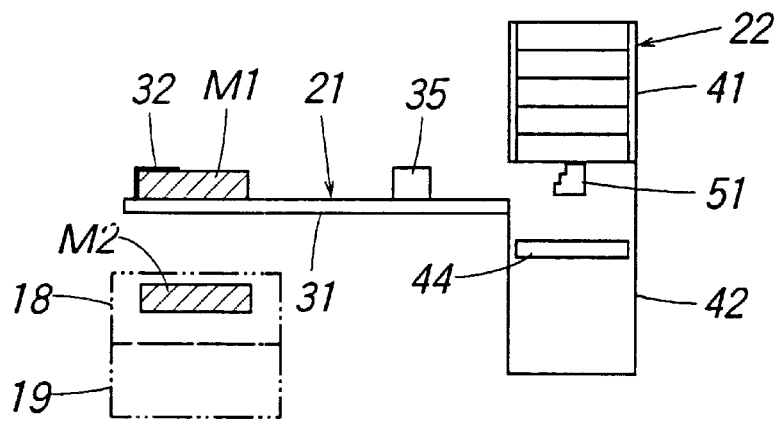
Figure 19:
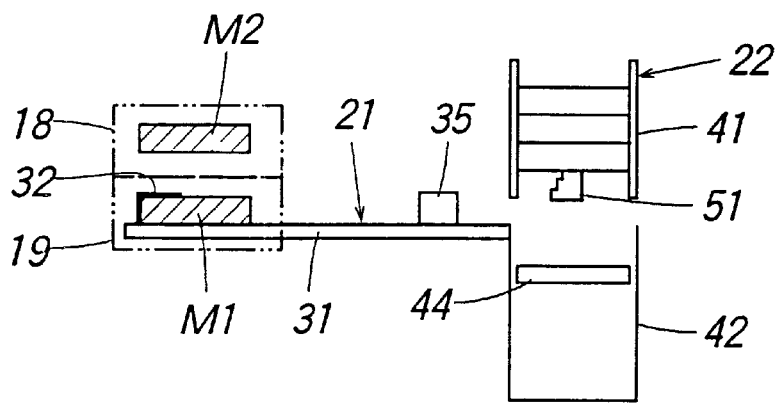

During or after the above operation, an unnecessary cassette M2 in the storing device 12 is taken into the cassette hand over unit 18 as depicted in FIG. 18, and then the cassette hand over units 18 and 19 are moved to the carrier 32. As illustrated in FIG. 19, the transporting mechanism 17 moves the cassette hand over units 18 and 19 into such a position that the empty cassette hand over unit 19 is brought in front of the carrier 32 and the newly supplied cassette M1 is inserted into the cassette hand over unit 19 as shown in FIG. 19.

Figure 20:
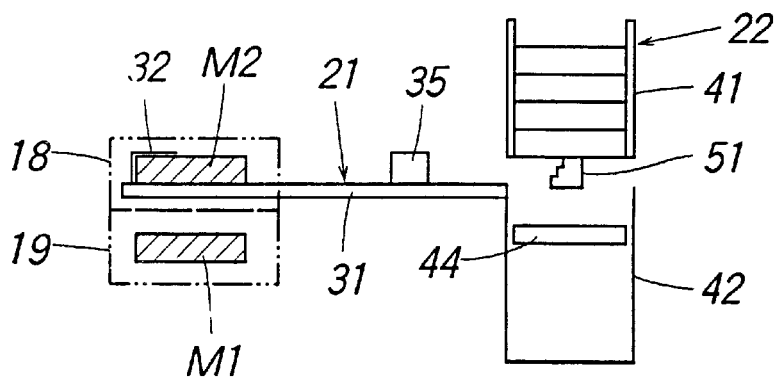

Then, as illustrated in FIG. 20, the transporting mechanism 17 moves the cassette hand over units 18 and 19 downward slightly into such a position that the cassette hand over unit 18 comes in front of the carrier 32. After that, the unnecessary cassette M2 in the cassette hand over unit 18 is pushed into the cassette 32.

Figure 21:
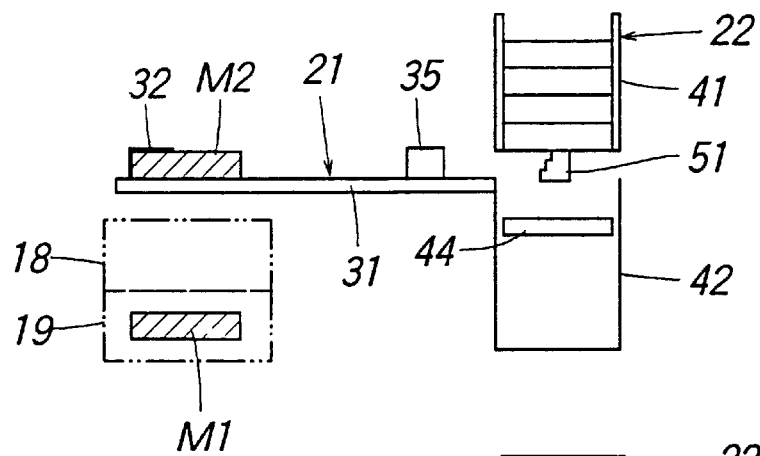

Next, the transport mechanism 17 moves the cassette hand over units 18 and 19 further downward into such a position that the cassette M1 can be moved into a given cassette room in the cassette storing device 12 as shown in FIG. 21.

Figure 22:
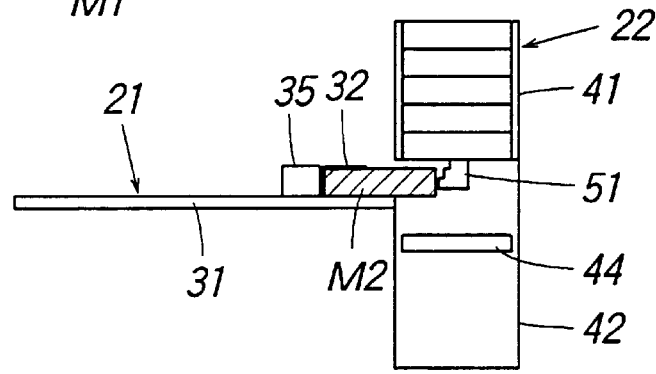

At the same time, the carrier 32 having the cassette M2 placed thereon is moved toward the mail box 22 as depicted in FIG. 22 and more than a half of the cassette M2 is projected into the cassette receipt room 42.

Figure 23:
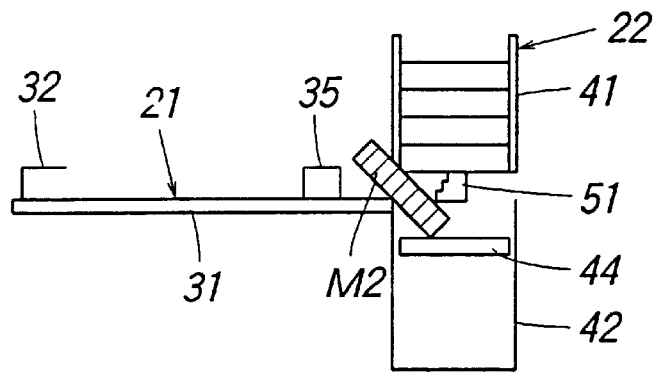
Figure 24:
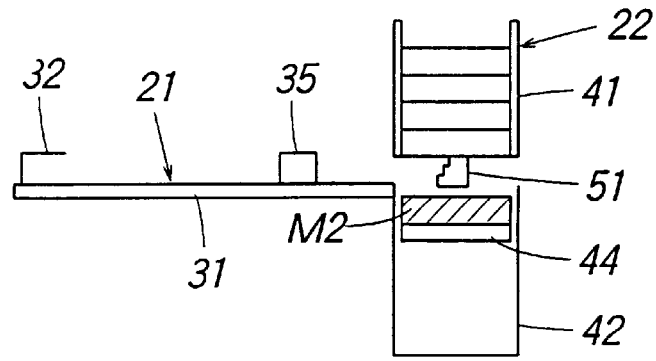

Next, the carrier 32 moves leftward as shown in FIG. 23. However, since the movement of the cassette M2 is restricted by the stopper 35 and the cassette is removed from the carrier 32. Therefore, the cassette M2 is tilted as shown in FIG. 23 due to the force of gravity and a half of the cassette is inserted into the cassette receipt room 42. Then, the cassette M2 falls down on the cassette receipt plate 44 as illustrated in FIG. 24.

As explained above in detail, in automatic cassette exchange apparatus of the present embodiment, the new cassette M1 can be automatically supplied into the apparatus and the unnecessary cassette M2 can be automatically taken out of the apparatus without stopping the operation of the apparatus. In this manner, the unnecessary cassette M2 can be replaced by the necessary cassette M1 in an automatic manner within a short time. Therefore, the operation efficiency of the automatic cassette exchange apparatus can be improved and the manual operation of the user can be dispensed with.

It should be noted that in the above explanation, the operation of removing the unnecessary cassette M2 from the apparatus and the operation of supplying the new cassette M1 into the apparatus are carried out simultaneously, but according to the invention, these operations may be performed independently from each other. Furthermore, the new cassette M1 may be installed into the recording and reproducing device or the unnecessary cassette M2 may be taken out of the recording and reproducing device.

As explained above, according to the automatic cassette exchange apparatus of the invention shown in FIG. 10, the removal of cassettes from the apparatus as well as the supply of cassettes into the apparatus can be performed by the mail box without stopping the usual operation of the apparatus. Therefore, the operation efficiency of the apparatus can be improved. Furthermore, the manual operation of the user can be minimized.

What is claimed is:

1. An automatic cassette exchange apparatus for automatically exchanging a plurality of record medium cassettes comprising:

a housing;

cassette storing means arranged within said housing for storing said record medium cassettes;

recording and reproducing means arranged within said housing for recording and reproducing information on and from said record medium cassettes;

mailing means for supplying and removing at least one record medium cassettes of said record medium cassettes into and from said housing;

cassette transporting means arranged within said housing for transporting said record medium cassettes among said cassette storing means, recording and reproducing means and mailing means, and including at least one cassette hand over unit and a driving unit for moving said cassette hand over unit; and controlling means for controlling said cassette storing means, recording and reproducing means, mailing means and cassette transporting means, wherein said mailing means includes a mailbox means arranged outside said housing, and a transport unit arranged within said housing for transporting said at least one record medium cassette between said mailbox means and said cassette hand over unit; and said mailbox means includes a cassette pushing mechanism for moving said at least one record medium cassette between said mailbox means and said transport unit: a cassette supply room and a cassette receipt room arranged below said cassette supply room so that said at least one record medium cassette can be contained in said mailbox means and held outside of said housing, and a user can access said at least one record medium cassette while contained in said mailbox means.

2. An apparatus according to claim 1, including more than one said cassette hand over unit, and said cassette hand over units are controlled by said controlling means to operate independently from each other.

3. An apparatus according to claim 1, wherein said cassette supply room of said mailbox means contains said cassette pushing mechanism for pushing said at least one record medium cassette out of said mailbox means toward said housing and onto said transport unit, and said transport unit transfers said at least one record medium cassette between said mailbox means and said cassette transferring means.

4. An apparatus according to claim 1, wherein said cassette pushing mechanism includes a reciprocating slide plate secured to a pushing member for selectively retrieving a single cassette from a stack of record medium cassettes in said cassette supply room and pushing said single cassette into said housing and onto said transport unit.

5. An automatic cassette exchange apparatus for automatically exchanging a plurality of record medium cassettes comprising:

a housing;

cassette storing means arranged within said housing for storing said record medium cassettes;

a recording and reproducing means arranged within said housing for recording and reproducing information on and from said record medium cassettes;

a cassette transporting means arranged within said housing for transporting said record medium cassettes among said cassette storing means, recording and reproducing means and mailing means, and including a plurality of cassette hand over units and a driving unit for moving said cassette hand over unit, said plurality of hand over units including a first cassette hand over unit and a second cassette hand over unit arranged in tandem with said first cassette hand over unit arranged above said second cassette hand over unit;

said mailing means for supplying and removing at least one record medium cassettes of said record medium cassettes into and from said housing, said mailing means including mailbox means arranged outside said housing so that said at least one record medium cassette can be placed in said mailbox means and held outside of said housing, and a user can access said at least one record medium cassette while said at least one record medium cassette is contained in said mailbox means: said mailing means further including a transport unit arranged within said housing for transporting said at least one record medium cassette between said mailbox means and a respective said cassette hand over unit, and a cassette pushing member for transferring said at least one record medium cassette between said mailbox mean and said transport unit; and a controlling means for controlling said cassette storing means, recording and reproducing means, mailing means and cassette transporting means.

6. An apparatus according to claim 5, wherein said pushing mechanism includes a stopper for selectively allowing passage of said at least one record medium cassette between said mailbox means and said transport unit, and a cassette pushing member for pushing said at least one record medium cassette in said mailbox means onto said transport unit.

7. An apparatus according to claim 6, wherein said stopper of said cassette pushing mechanism restricts movement of said at least one record medium cassette on said transport unit, so that said at least one record medium cassette falls into said cassette receipt room due to force of gravity.

8. An apparatus according to claim 5, wherein said cassette supply room of said mailbox means contains said cassette pushing mechanism for pushing said at least one record medium cassette out of said mailbox means toward said housing and onto said transport unit, and said transport unit transport unit transfers said at least one record medium cassette between said mailbox means and said cassette transferring means.

9. An apparatus according to claim 5, wherein said cassette pushing mechanism of said mailbox means includes a reciprocating slide plate secured to a pushing member for selectively retrieving a single cassette from a stack of record medium cassettes in said cassette supply room and pushing said single cassette into said housing.

* * * * *